(12) United States Patent
Miksic et al.

(10) Patent No.: US 6,984,426 B2
(45) Date of Patent: Jan. 10, 2006

(54) BIODEGRADABLE BAG

(75) Inventors: Boris A. Miksic, North Oaks, MN (US); Pasko Vela, Lino Lakes, MN (US); Robert Berg, Richfield, MN (US); Robert Boyle, Oakdale, MN (US)

(73) Assignee: Cortec Corporation, St. Paul, MN (US)

( * ) Notice: Subject to any disclaimer, the term of this patent is extended or adjusted under 35 U.S.C. 154(b) by 56 days.

(21) Appl. No.: 10/452,535

(22) Filed: Jun. 2, 2003

(65) Prior Publication Data

US 2004/0241359 A1  Dec. 2, 2004

(51) Int. Cl.
C08L 67/02 (2006.01)

(52) U.S. Cl. ..................... 428/35.7; 528/354
(58) Field of Classification Search .............. 428/35.7; 528/354
See application file for complete search history.

(56) References Cited

U.S. PATENT DOCUMENTS

| | | | |
|---|---|---|---|
| 5,216,050 A | 6/1993 | Sinclair | 524/108 |
| 5,444,113 A | 8/1995 | Sinclair et al. | 524/306 |
| 5,760,118 A | 6/1998 | Sinclair et al. | |
| 5,834,582 A * | 11/1998 | Sinclair et al. | 528/354 |
| 6,028,160 A * | 2/2000 | Chandler et al. | 528/176 |
| 6,323,307 B1 | 11/2001 | Bigg et al. | 528/354 |
| 6,797,788 B1 * | 9/2004 | Claeys et al. | 525/411 |

FOREIGN PATENT DOCUMENTS

| | | |
|---|---|---|
| EP | 1227129 | 7/2002 |
| EP | 1227130 | 7/2002 |
| GB | 2231027 A * | 11/1990 |
| JP | 2001239634 | 9/2001 |
| JP | 2002293961 | 10/2002 |
| JP | 2002327107 | 11/2002 |
| JP | 2002348445 | 12/2002 |
| JP | 2003064245 | 3/2003 |
| JP | 2003082212 | 3/2003 |
| WO | WO2002/059200 | 8/2002 |
| WO | WO2002/059201 | 8/2002 |
| WO | WO 200259201 A1 * | 8/2002 |

* cited by examiner

*Primary Examiner*—Sandra Nolan Rayford
(74) *Attorney, Agent, or Firm*—Haugen Law Firm

(57) ABSTRACT

A biodegradable film formable into biodegradable bags includes the blended product of polylactic acid and a suitable biodegradable polymeric resin. The blended product includes from about 5% to about 50% by weight polylactic acid.

6 Claims, No Drawings

BIODEGRADABLE BAG

FIELD OF THE INVENTION

This invention relates to biodegradable materials generally, and more particularly to biodegradable resin blends used to create fully biodegradable films that have enhanced strength properties for utilization as the structural walls for various bag containers.

BACKGROUND OF THE INVENTION

Biodegradable materials have long been studied for their applicability in commonly-used products. Recently, increased emphasis has been placed on developing products made from biodegradable materials as replacements for existing, non-biodegradable products. In fact, some governmental regulations call for the phasing out of certain non-biodegradable products in lieu of biodegradable counterparts.

The changeover to the utilization of biodegradable materials in such products, however, has been met with both implementation challenges, as well decreased performance issues. Furthermore, products fabricated from biodegradable materials have typically been more expensive than conventional non-biodegradable products. Such issues have limited the extent to which products fabricated from biodegradable materials have been widely accepted in residential or industrial applications alike.

A particular example of a product that is well suited for the use of biodegradable material is a bag, such as those commonly used and/or sold at grocery stores, or temporary refuse containers, and the like. Recently, certain municipalities have required the use of biodegradable bags. To qualify as "biodegradable", materials forming the biodegradable product must have at least a 90% conversion rate of starting material to $CO_2$ and water within six months of disposal thereof. Bags and other containers fabricated from biodegradable materials that have been utilized to date, however, do not perform as well strengthwise as conventional products, and are typically more expensive than such conventional products.

A specific drawback to currently available containers, more particularly bags, fabricated from biodegradable materials is the low strength characteristics associated with such materials. Accordingly, currently available biodegradable containers are undesirably weak, in that such products are substantially stretchable under relatively low forces.

To date, efforts in creating viable and economical fully biodegradable materials have focused primarily on blending known biodegradable polymeric resins such as polyesters with starch to reduce the cost. A popular blend is a resin mixture called Mater-Bi produced and sold by Novamont. Bags made from the Mater-Bi material are widely available, but have substantial physical drawbacks such as low elongation resistance, low puncture resistance, and poor moisture resistance.

Two primary problems to be overcome in order to increase acceptance and use of biodegradable products are strength and price. Polyethylene, one of the most commonly used polymeric resins base for non-biodegradable films used in the manufacture of, for example, bags, is a low cost resin that is versatile enough to handle the physical requirements of any disposal bags. Polyethylene bags are also typically less expensive than their biodegradable counterparts. Such characteristics of polyethylene represent a marketing barrier to the acceptance of similar biodegradable products.

We have surprisingly found that commonly-utilized biodegradable polymeric resins can be blended with a polylactic acid to produce substantially stronger fully biodegradable films than those presently available. A particular characteristic of the resulting films is reduced elongation under load. Thus, the blends of the present invention enable the production of substantially more durable bags. In addition, the fully biodegradable films of the present invention are typically less costly to produce than currently manufactured biodegradable films. Such factors are important in increasing acceptance of biodegradable containers in environmental programs worldwide.

Lactic acid polymers have been extensively investigated for many years. Primarily, attention has been focused on the biodegradable aspects of such lactic acid polymers. A great deal of work in the last twenty years centered on the medical use of these polymers, upon which many patents have issued. A patent related to uses for polylactic acid is U.S. Pat. No. 6,323,307, issued to Cargill Dow Polymers on Nov. 27, 2001.

Other patents relating to the use of polylactic acid include U.S. Pat. Nos. 5,216,050 and 5,444,113. Such patents generally describe polylactic acid polymers that can be blended or plasticized with internal or external plasticizers.

The invention of the present application describes a simple straightforward method of using PLA to produce a useful product for a rapidly growing environmental problem. The bags of the present application are unexpectedly tougher, stronger, can handle much heavier loads, and use less resin than conventional biodegradable bags currently available.

It is therefore a primary object of the present invention to provide fully biodegradable materials in film form having strength characteristics similar to that of polyethylene film.

It is a further object of the present invention to provide biodegradable bags formed from one or more fully biodegradable films having strength and durability characteristics similar to that of conventional polyethylene films.

It is another object of the present invention to provide economical fully biodegradable films having enhanced strength and durability characteristics.

It is a still further object of the present invention to provide fully biodegradable films comprising a blended product of polylactic acid and a suitable biodegradable polymeric resin, such as a polyester.

It is a yet further object of the present invention to provide fully biodegradable films comprising a blended product of about 30% by weight polylactic acid and about 70% by weight of a suitable biodegradable polymeric resin.

It is another object of the present invention to provide a biodegradable bag being formed from one or more fully biodegradable blown films, which films are a blended product of polylactic acid and a suitable biodegradable polymeric resin.

It is another object of the present invention to provide a fully biodegradable bag formed from one or more biodegradable films having a caliper thickness of about 2 mils or less.

SUMMARY OF THE INVENTION

By means of the present invention, fully biodegradable films are provided having enhanced physical strengths and durability properties over existing biodegradable films. In addition, the fully biodegradable films of the present invention are considerably less expensive than presently available biodegradable films.

The biodegradable films of the present invention are preferably a blended product of polylactic acid and a suitable biodegradable polymeric resin, with the blended products being from about 5% to about 50% by weight polylactic acid.

In preferred embodiments of the present invention, the polylactic acid-containing biodegradable films may be formed into a bag. In some embodiments, the biodegradable bag may be in the form of a drawstring bag or a die cut bag having a caliper thickness of less than 2 mils.

Preferably, the biodegradable films of the present invention are formed through a blown film process.

DETAILED DESCRIPTION OF THE PREFERRED EMBODIMENTS

The objects and advantages enumerated above together with other objects, features, and advances represented by the present invention will now be presented in terms of detailed embodiments. Other embodiments and aspects of the invention are recognized as being within the grasp of those having ordinary skill in the art.

Polylactic acid (PLA), which is marketed by Cargill-Dow under the trade name Cargill-Dow 4042, is typically used for producing biodegradable utensils. Films that are prepared from PLA are stiff, have little elongation and poor tear strength, but are finding some use as food wrappers, lid tops and other applications in which strength and elongation characteristics are not critical.

The present invention has revealed that PLA, when blended with a biodegradable resin such as polyester, forms a starting material mixture that can be processed into relatively thin films having desired physical properties not previously achieved in fully biodegradable materials. A variety of materials may be selected for use with the PLA in obtaining a suitable resin blend. Preferably, such materials provide added resiliency characteristics to the blended product. In addition, such materials are preferably biodegradable, whereby the blended product is fully degradable, with the PLA component and the other resin components each being biodegradable. In some embodiments of the present invention, each of the biodegradable components in the blended product biodegrade at similar rates throughout the biodegradation process.

A particular example of a biodegradable resin material that is useful in blends of the present invention with PLA is polyester, which is well known as a biodegradable polymeric material, and is utilized in a variety of applications. Other biodegradable resins, however, may be utilized in blended products of the present invention, so long as a portion of the blend comprises PLA. A polyester resin material particularly useful in compositions of the present invention is sold by BASF under the trade name "Ecoflex FBX 7011".

As a measure of comparison between films having a caliper thickness of about 2 mils or less of the present invention and similar thickness films formed from polyester alone, films produced with 20% of PLA 4042 blended with the polyester resin exhibits a reduced elongation under a given load from 400% to 125%, and the tensile strength is almost doubled with respect to the conventional films. This unexpected improvement enables the production of stronger and, particularly, thinner caliper products having strength characteristics suitable for use in a variety of containers.

An additional advantage introduced through the use of PLA is in the fact that PLA is derived from a renewable resource, as opposed to the typically utilized biodegradable polymeric resins derived from oil-based chemicals. The enhanced strength characteristics of the present blended products allow for relatively thinner films used in containers, thereby reducing the amount of material needed for each product.

A particular application for biodegradable films today is in the manufacture of bags used in packaging and storing compostable material. Presently available biodegradable flexible films suitable for packaging compostable material are available from Eastman, Union Carbide, DuPont, Showa Denko, BASF and Cargill-Dow. All of the films are capable of preparing such bags, though their respective costs and physical properties as compared to conventional polyethylene bags have limited their success in the marketplace. Bionelle 3001, a biodegradable resin developed by Showa Denko (Japan) and FBX-7011 produced by BASF (Germany) are two example biodegradable resins currently utilized in making bags being sold into the composting industry. Such biodegradable resins may be used in the blends of the present invention along with PLA to create fully biodegradable materials exhibiting strength and cost characteristics resembling conventional non-biodegradable materials.

A standard 30 gallon size biodegradable bag in the industry is made with about 1.5 mil FBX-7011. A FBX-7011 bag manufactured to an average caliper of 1.5 mils stretched 460% in one direction and 625% in another under a specific test load before breaking. Tensile (psi) at break averaged 2500 psi in one direction and 2800 psi in the other. Such results illustrate the restrictive weight limitations of conventional biodegradable bags in the composting industry and preclude the use for anything but relatively lightweight applications.

By comparison, a film of the present invention prepared with the inclusion of 20% PLA 4042 in the resin mix produced a thinner film with better physical strength properties. The average caliper of this new film was 1 mil; the tensile at break was 4600 psi in one direction and 3700 psi in the other, and elongation at break was 126% in one direction and 522% in the other. Measurements on other film blends with an average caliper of 0.75 mils are noted in Examples 2 and 3.

In addition to the enhanced physical properties exhibited by films of the present invention, a major aspect of this new blend is the reduction in caliper of up to 50%, which reduces the cost of the finished product significantly. The caliper thickness of up to about 2 mils, and preferably about 0175 to about 1.25 mils, is utilized for maintaining flexibility and shape adaptability for the bags of the present invention. Such aspects are extremely important in obtaining wider acceptance in composting programs and other applications.

EXAMPLE 1

A mixture of biodegradable resin pellets and PLA pellets was prepared from 95 parts BASF resin FBX-7011 and 5 parts of Cargill Dow (PLA) 4042. After thorough blending, a film was produced from a circular die maintained at a temperature of about 165° C. in a conventional blown film machine. The film was produced at a thickness of one mil and the properties compared to a film 50% thicker prepared with no PLA.

| Average 6 measurements | 100% PBX-7011 (1.5 mil) | 95-5 (7011-PLA) 1 mil |
| --- | --- | --- |

-continued

| | | |
|---|---|---|
| Tesnile Strength at Break MD | 2582 psi | 6545 psi |
| Tesnile Strength at Break CD | 2805 psi | 4974 psi |
| Elongation at Break MD | 460% | 190% |
| Elongation at Break CD | 625% | 593% |

The 5% of PLA blended with the FBX-7011 resin substantially increased the tensile strength and decreased the elongation of the film. These gains in physicals are substantial and were produced with a film of 1 mil thickness as compared to 1.5 mil of the 100% FBX-7011 resin.

EXAMPLE 2

A blend of PLA pellets with BASF FBX-7011 pellets in a ratio of 70 parts FBX-7011 to 30 parts PLA were used to produce films with an average caliper of 1 mil and 0.75 mil.

| Average 6 measurements | 1 mil | 0.75 mil |
|---|---|---|
| Tensile Strength at Break MD | 4900 psi | 6479 psi |
| Tensile Strength at Break CD | 7900 psi | 4631 psi |
| Elongation at Break MD | 434% | 66% |
| Elongation at Break CD | 144% | 360% |

EXAMPLE 3

A blend of 40 parts PLA pellets with a 60 parts FBX-7011 pellets were used to make a 1 mil and a 0.75 mil films with the following properties:

| Average 6 measurements | 1 mil | 0.75 mil |
|---|---|---|
| Tensile Strength at Break MD | 5390 psi | 6990 psi |
| Tensile Strength at Break CD | 9184 psi | 4226 psi |
| Elongation at Break MD | 277% | 77% |
| Elongation at Break CD | 168% | 162% |

EXAMPLE 4

Seventy parts of Bionolle 3001 from Showa Denko (Japan) was mixed with 30 parts of PLA 4042 and extruded as a blown film with a thickness of 2-mil. The elongation was reduced and the tensile strength increased.

Biodegradable Bags with Draw Strings

Initial attempts to prepare a draw strap for biodegradable bags focused on trying straps prepared from the same standard biodegradable resins as is done with conventional polyethylene household bags. These attempts were unsuccessful, as the straps prepared from the standard biodegradable resins exhibited excessive elongation under load, and performed poorly in closing the bag. Trials utilizing thicker films were also unsuccessful. The new PLA blends of the present invention at about a 70-30 ratio (Examples 2 and 4) produced a strap with substantially less elongation, greater stiffness, and overall good performance closing the new bags particularly in the low frictional resistance between the bag and the strap. In addition, the packaging materials for the present invention are completely biodegradable.

Die Cut Bags

Die Cut bags are very common in carrying bag applications. The handles are die cut and are used to carry the bag. Bags made from 100% standard biodegradable resins are limited in scope as the die cut handle stretches too much under load. This precludes their use in any but lightweight load situations. Many specialty stores that sell organic foods use biodegradable bags when the load is light such that the handle will not significantly stretch. The current films having, for example, 30% by weight PLA, perform well as die cut bags with a handle that is strong enough to function with much heavier loads in the bag as compared to the loads placed on the conventional biodegradable bags. The bags using films of the present invention are less expensive to produce, have superior physical characteristics, and will increase customer satisfaction and acceptance.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A biodegradable bag having a caliper thickness of about 2 mils or less, and being formed from one or more biodegradable films, said biodegradable films consisting essentially of a blended product of equal to or less than about 30% by weight polylactic acid and balance aliphatic aromatic copolyester resin, with said copolyester resin having a melt flow rate of less than about 5 g/10 min, such that said films exhibit reduced elongation under load.

2. A biodegradable bag as in claim 1 wherein said blended product includes from about 5% to about 30 by weight polylactic acid.

3. A biodegradable bag as in claim 1 wherein said blended product is film formed from a blown film extrusion process.

4. A biodegradable bag as in claim 1 wherein said caliper thickness is about 1 mil.

5. A biodegradable bag as in claim 4 in the form of a drawstring bag.

6. A biodegradable bag as in claim 4 in the form of a die cut bag.

* * * * *